April 25, 1933. G. P. BERRY 1,905,888

SCREW TYPE MECHANICAL LASH ADJUSTER FOR VALVES

Filed May 27, 1931 2 Sheets-Sheet 1

Inventor
George P. Berry
By Blackmore, Spencer or Hub-
Attorneys

April 25, 1933.   G. P. BERRY   1,905,888
SCREW TYPE MECHANICAL LASH ADJUSTER FOR VALVES
Filed May 27, 1931   2 Sheets-Sheet 2

Inventor
George P. Berry
By Blackmore, Spencer & Nich-
Attorneys

Patented Apr. 25, 1933

1,905,888

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

SCREW TYPE MECHANICAL LASH ADJUSTER FOR VALVES

Application filed May 27, 1931. Serial No. 540,299.

This invention has to do with slack adjusters for taking up slack in valve gear for internal combustion engines, and the like. The construction is entirely mechanical in design, and is characterized by the provision of a part which is urged in a direction to take up the slack between the parts. This part preferably takes the form of a screw threaded member which is operated upon by a spring, preferably of the torsion type, the spring tending to rotate the part in a direction to take up slack. With the construction, as so far described, the disadvantage exists that the friction between the threads is so great as to not permit the retraction of the screw when the valve gear expands so that the valve would then be held off its seat, reducing the compression in the engine cylinder and resulting in the rapid destruction of the valve as a result of the passage of hot gases between the valve and its seat during the firing of the charge.

To overcome this disadvantage, I have provided means to effect retraction of the screw to a slight extent upon each cycle of valve operation. This means may take the form of a nut within which the threaded part is received, the nut being arranged to move with the valve gear, and an arrangement being provided to oscillate the nut in opposite directions during each cycle. The oscillation of the nut in one direction would, of course, through the gripping action of the threads, tend to extend the threaded part in a direction to unseat the valve, but the resistance of the valve spring will, in practice, result in the threaded part turning about its axis as if integral with the nut so that there is actually no extension of the threaded part. Upon oscillation of the nut in the opposite direction it rotates with respect to the threaded part, retracting it. When the valve is again on its seat, the torsion spring will rotate the threaded part to take up slack. This projection and retraction of the threaded part will take place during each cycle of valve operation so that the system will at all times be free from slack and the usual clicking of the valves will be substantially eliminated with attendant advantages in engine performance, well known to the automotive engineer.

Figure 1:
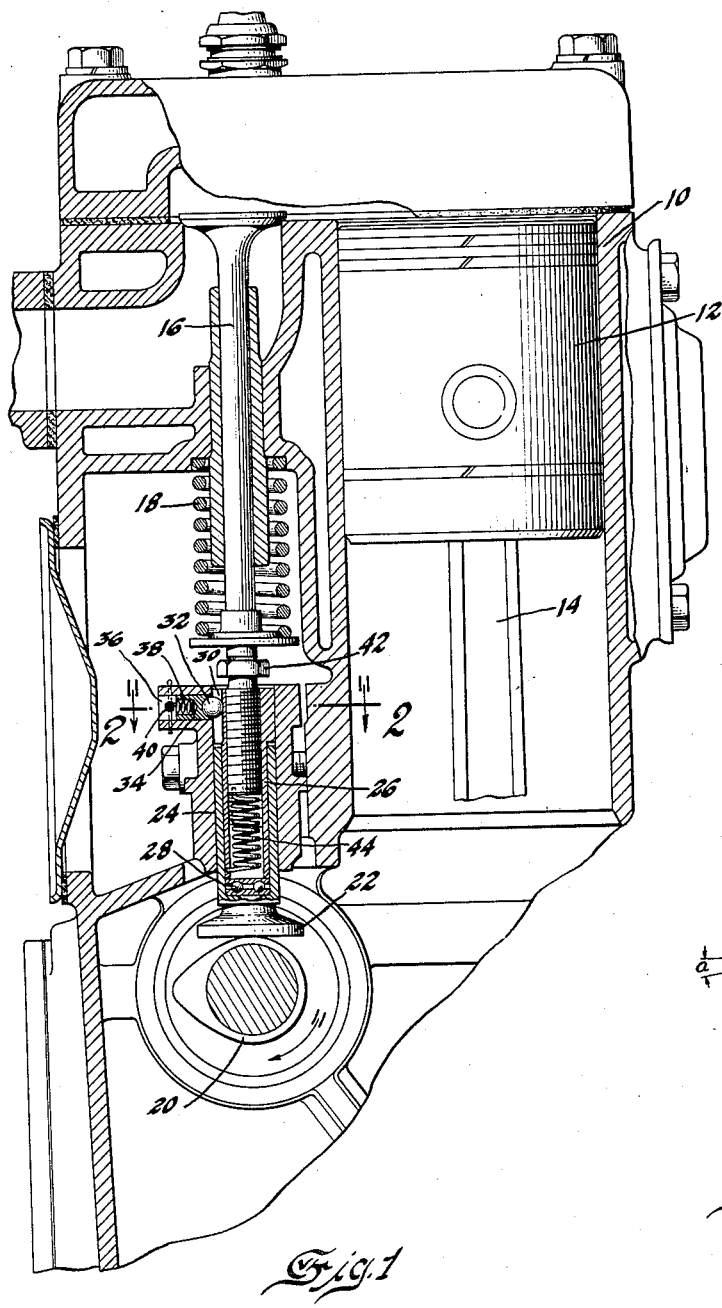
Figure 1 is a section through a portion of an L-head type engine showing my improved slack adjuster applied to the valve gear.
Figure 2:
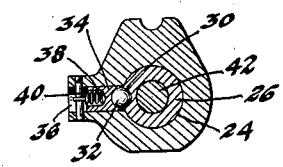
Figure 2 is a section on line 2—2 of Figure 1.
Figure 3:
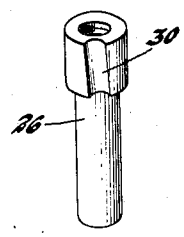
Figure 3 is a perspective view of the nut embodied in the tappet shown in Figure 1.

I have shown at 10 a portion of the cylinder of the engine; at 12 the piston provided as usual with the connecting rod 14. I have shown at 16 one of the valves held upon its seat by coil spring 18 in the usual manner. At 20 there is shown one of the cams on the camshaft, the cam operating a tappet 22 of the mushroom type slidably mounted in bore 24. The centerline of the cam is offset with respect to the axis of the tappet so that the tappet is free to rotate through the action of the cam presenting fresh wear surfaces during operation of the valve gear. This, of course, is conventional.

Within the tappet 22 is slidably mounted a nut 26. The nut rests upon ball thrust bearing 28 so that the nut and tappet may freely revolve with respect to each other. The nut 26 is provided with a spiral slot 30, in its side wall preferably of 4° angle. The slot is adapted to receive a fixed member so that as the nut is moved up and down, as a result of cam action, it is also given a slight back and forth oscillatory movement. The fixed member may take the form of a ball 32 received in a cup 34 slidably mounted in bore 36. A compression spring 38 reacting against pin 40 holds the cup 34 in engagement with the ball, and the ball in engagement with slot 30.

Within the nut 26 there is threaded the screw 42. A torsion spring 44 has one end anchored in the nut and the other end anchored in the screw. The spring is under torsion so that it tends to project the screw 42 out of the nut.

The construction operates as follows, assuming that the cam revolves in the direction indicated by the arrow in Figure 1. With the tappet on the base circle of the cam, as shown in the figure, it is apparent that the torsion spring 44 is free to rotate the screw 42 and project it outwardly until it contacts with the end of the valve stem. It is assumed that the parts are in this position. As the cam raises the tappet to lift the valve the nut 26 is rotated by the engagement of ball 32 with the slot 30. In the form shown, this rotation is in a direction to tend to project the screw 42 out of the nut as the valve is lifted. This action, however, is resisted by the force of the valve spring. In this direction of oscillation of the nut the contact between the threads of the nut and screw, in effect constitutes a friction clutch tending to couple the nut and screw together for rotary movement. The only resistance to this rotary movement is the friction between the end of the valve stem and the top of the screw, and this resistance is less than the frictional resistance between the screw threads so that the sliding movement takes place between the screw and the valve stem. When the valve has been raised to the limit of its movement it is then returned toward seating position by the action of the spring, and the nut 26 is oscillated in the opposite direction causing it to approach the head of the screw. In other words, the friction clutch constituted by the frictional grip between the threads of the nut and screw disengages since the movement is in the reverse direction, and the threads of the screw are, in effect, sliding downhill on the threads of the nut instead of uphill as in the previous part of the cycle. In other words, the action between the threads is now reversed, and instead of the threads of the nut being rotated in a direction to wedge the screw upwardly, they are rotated in a direction to withdraw the wedge and let the screw down. In this last operation the force of the valve spring assists the nut, while in the opposite direction the force of the valve spring opposes the action of the nut. When the tappet again reaches the base circle there is a slight amount of slack which is almost immediately taken up by the spring 44 rotating the screw 42 and projecting it upwardly into engagement with the bottom of the valve stem. This action is repeated upon each cycle of valve operation.

It will be noted that the in and out engagement of the screw 42 takes place during each cycle of movement, and during this operation the slack takeup mechanism can adjust itself to care for expansion of the parts due to heating, or contraction of the parts, due to cooling. This adjustment obviously takes place when the tappet returns to the base circle and the spring 44 projects the screw 42 upwardly into engagement with the valve stem. If the parts have expanded the screw is then projected upwardly a lesser distance by the spring. If the parts have contracted the screw is projected upwardly a greater distance.

In the foregoing description I have assumed that the relative movement between the nut and screw takes place during the seating of the valve. If preferred, the slope of the threads may be reversed, or the slope of the spiral slot may be reversed, and in such case the relative rotation of nut and screw will take place upon the lifting of the valve. With either construction the operation is substantially the same, except that the form first described has a slight advantage in that the valve is opened a little more.

Figure 4:
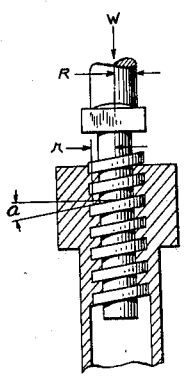
Figure 4 is a detail view of the screw and nut used to illustrate the mathematical analysis of the mechanism.

Obviously my device owes its success to the fact that in one direction of movement the screw and nut operate together and in the other direction they break apart. The reason for this action may be made clearer by reference to Figure 4 and the following mathematical analysis. In this figure I have shown a square thread screw for the sake of simplicity.

In the figure:

$a$ = Angle of thread
$r$ = Mean radius of screw (pitch radius)
$R$ = Radius of valve stem or resisting moment of sliding friction between valve stem and nut.
$w$ = Instantaneous pressure of valve spring plus inertia forces involved.
$F_1$ = Force at lever arm $r$ (pitch circle of screw) to raise screw.
$F_2$ = Force at lever arm $r$ (pitch circle of screw) to lower screw.

$\theta$, the angle of repose, is the angle of inclination of the surface of one body at which another body will begin to slide along it, under the action of its own weight. $\theta$ is approximately 8° for steel on steel. This angle varies with different materials and is dependent upon the condition of the sliding surfaces and the lubrication of these surfaces. Any angle of screw thread greater than $\theta$ would not be self locking.

Assume for example:

$$w = 100 \text{ lbs.}$$
$$r = R = \tfrac{3}{16}'' = (.1875)$$
$$a = 4°$$

Force $F_1$ = force at radius $r$ to raise screw $$F_1 = \frac{Wr(\tan \theta + \tan a)}{r}$$

$$F_1 = \frac{100 \times .1875(.14 + .070)}{.1875} =$$

$$100 \times .21 = 21 \text{ lbs.}$$

Force $F_2$ = force at radius $r$ to lower screw $$F_2 = \frac{Wr(\tan \theta - \tan a)}{r}$$

$$F_2 = \frac{100 \times .1875(.14 - .07)}{.1875} = 100 - .07 = 7 \text{ lbs.}$$

In this case with a 4° thread angle the moment of frictional contact $R$ between the valve stem and the screw should be between 7 and 21 pounds for proper operation of the device. Should it exceed 21 lbs. it would extend the screw, unseating the valve. If less than 7 lbs., it would not retract the screw to compensate for expansion.

It will be readily seen that the range of $R$ may be greatly extended by increasing the thread angle of the screw. Let us make the thread angle 6° which would still give us a self locking thread.

$$a = 6°$$

Then $$F_1 = \frac{Wr(\tan \theta + \tan a)}{r}$$

$$F_1 = \frac{100 \times .1875(.14 + .105)}{.1875} =$$

$$100 \times .245 = 24.5 \text{ lbs.}$$

$$F_2 = \frac{Wr(\tan \theta - \tan a)}{r}$$

$$F_2 = \frac{100 \times .1875(.14 - .105)}{.1875} =$$

$$100 \times .035 = 3.5 \text{ lbs.}$$

With a 6° screw thread the resistance to turning between the valve stem and the screw would have to be greater than 24.5 lbs. before an extension of the screw would occur while a frictional moment of 3.5 lbs. at $R$ would retract screw as nut oscillated. Any variation in pressure $W$ would be accompanied by an equivalent change in frictional moment $R$, thus permitting $w$ to vary to any degree without affecting the operation of the device.

The slot 30 may be of such angle as is found best for the particular design. I have given one angle for illustrative purposes only.

The construction is capable of application to overhead valve engines as well as L-head engines, and is obviously useful in any train of mechanism where a similar problem of taking up slack is presented.

It is obvious also that the slack takeup mechanism need not necessarily be incorporated in the tappet, but may be built into other parts of the valve gear.

Figure 5:
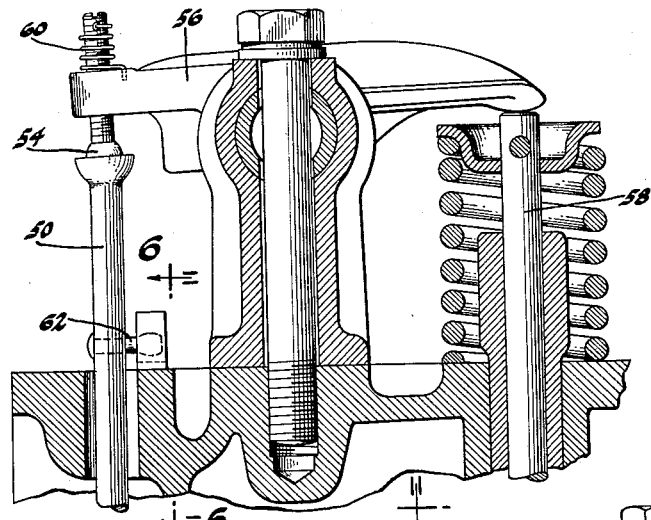
Figure 5 is a fragmentary view of the application of a modified form of my invention to overhead valve mechanism.

If preferred the projection 32 and slot 30 may be reversed, the projection being carried by the nut and the slot being cut in a fixed part. However, I prefer the arrangement shown. I have illustrated such a construction in Figures 4, 5 and 6. Here 50 indicated a push rod having its lower end engaged by tappet 52 operated by the cam in the usual manner. The upper end of the push rod received a ball stud 54 threaded in the end of overhead rocker arm 56 which at its other end engages the stem of the valve 58. Torsion spring 60, having one end fixed to the shank of the ball stud 54 and the other end anchored in the rocker arm 56, tends to rotate the stud in a direction to take up slack in the system. At some suitable point, intermediate its length, the push rod 50 carries a projection 62 which engages in an angular slot 64 formed in the engine frame, or other fixed member. The operation is the same as that previously described.

Figure 6:
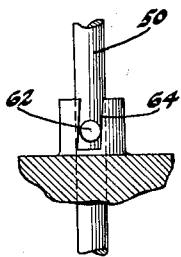
Figure 6 is a detail of Figure 5 taken on line 6—6 of Figure 5.
Figure 7:
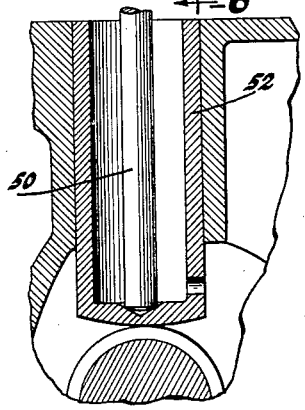
Figure 7 is a section through a portion of an overhead valve engine in which a modified form of my slack adjuster has been incorporated.
Figure 7:
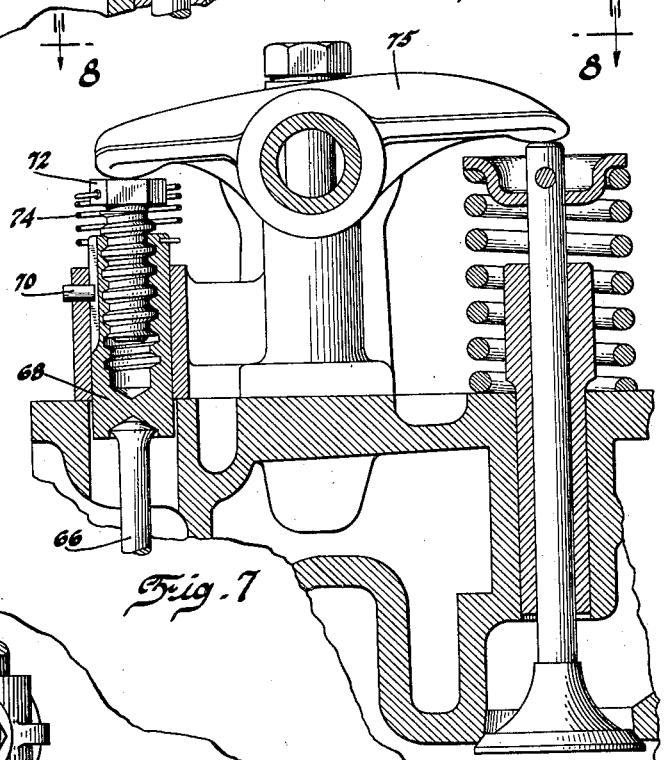
Figure 8:
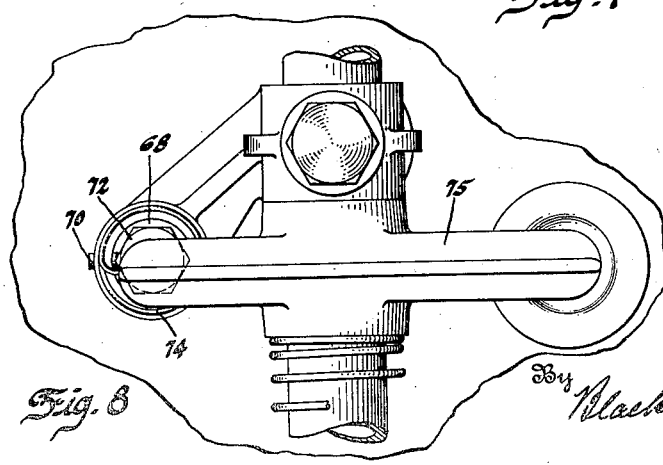
Figure 8 is a top plan view of the valve gear of Figure 7.

In Figures 7 and 8 I have shown a further modification. Here the push rod 66 engages at its upper end with cross head 68 confined for reciprocating movement by key 70. Screw 72 is threaded in the cross head, and torsion spring 74 tends to rotate the screw in a direction to take up slack, as in the other forms of my invention. As shown in Figure 6, the screw 72 is engaged by rocker arm 75 at a point to one side of the axis of the screw.

This form operates as follows: With the valve seated, as shown, the torsion spring 74 operates as before to take up slack. Upon upward movement of the push rod and cross head, the end of the rocker arm, owing to its offset position with respect to the axis of the screw, tends to rotate the screw in a direction to cause its threads to slide uphill on the threads of the cross head. However, since the friction between the threads is greater than the friction between the screw and the rocker arm, a sliding movement takes place between the latter. On the seating movement of the valve the end of the rocker arm tends to rotate the screw in a direction to cause the threads of the screw to slide downhill on the threads of the push rod, and such action takes place, producing slack in the system. When the valve is seated and the tappet is on the base circle of the cam, the spring 74 rotates the screw in a direction to project it out of the cross head and take up slack. In this construction the offset relation of the end of the rocker arm, with respect to the axis of the screw, is the means for producing slack in the system upon each cycle of valve operation.

I claim:

1. Operating mechanism for valves and the like adapted to have cyclical movement, including a slack takeup device comprising interfitting parts capable of relative rotation, yielding means tending to produce relative rotation of said parts to increase their overall length and take up slack in the system, a stationary part, and pin and slot means carried by one of said interfitting parts and said stationary part for oscillating said interfitting part upon operation of said valve gear to produce slack in the system.

2. A valve tappet, a nut rotatably mounted in the tappet, a screw threaded in the nut, a spring yieldingly tending to unscrew said parts, a guide for said tappet, said guide and nut having interfitting parts to effect oscillation of the nut upon reciprocation thereof.

3. Operating mechanism for valves and the like adapted to have cyclical movement including a slack take up device comprising reciprocating parts capable of relative rotation to increase or decrease their overall length, yielding means tending to produce relative rotation of said parts in one direction to increase their overall length to take up slack in the system, and means operated by reciprocation of said mechanism for producing relative rotation of said parts in the opposite direction to introduce slack into the system.

4. Reciprocating mechanism for operating valves and the like comprising a pair of parts arranged in contact along a spiral path so that upon relative rotation thereof their overall length is increased or decreased, means for reciprocating said mechanism, means operated by reciprocation thereof for producing relative rotation of said parts in a direction to decrease their overall length, and yielding means tending to produce relative rotation of said parts in the opposite direction to increase their overall length to take up slack in the system.

5. A train of mechanism for operating valves and the like adapted to have cyclical movement comprising parts having contact along a spiral path so that relative rotation of the parts increases or decreases their overall length, means for reciprocating said mechanism, and means operated by reciprocation of said mechanism for rotating one of said parts in a direction to decrease the overall length of said parts and introduce slack into the system, and yielding means tending to rotate said part in the opposite direction to increase their overall length and take up slack in the system.

6. A train of mechanism for operating valves and the like adapted to have cyclical movement comprising a pair of reciprocable parts threaded together so that relative rotation thereof increases or decreases their overall length, means for reciprocating said mechanism, and means brought into action by reciprocation of one of said parts for rotating said part to decrease the overall length of said parts, and yielding means tending to produce relative rotation of said parts in the opposite direction to increase their overall length and take up slack in the system.

7. A train of mechanism for operating valves and the like adapted to have cyclical movement comprising a pair of parts threaded together so that relative rotation thereof increases or decreases their overall length, means for reciprocating said mechanism, and means operated by reciprocation of said mechanism for rotating one of said parts in a direction to decrease the overall length of said parts and introduce slack into the system, and yielding means tending to produce relative rotation of said parts in the opposite direction to increase their overall length and take up slack in the system.

8. In valve operating mechanism the combination of a cam shaft having a cam thereon, reciprocating mechanism driven thereby including a tappet engaging the cam, parts actuated by the tappet having contact along a spiral path so that relative rotation of the parts increases or decreases their overall length, means actuated by reciprocation of the mechanism for producing relative rotation of said parts in a direction to take up slack in the system, and yielding means tending to produce relative rotation of said parts in the opposite direction to increase their overall length to take up slack in the system.

9. In operating mechanism for valves and the like the combination of a cam shaft having a cam thereon, a push rod operated thereby, a reciprocating member having a stud threaded therein and engaging the push rod, yielding means tending to rotate the stud in a direction to cause it to approach the push rod, means for rotating the push rod during operation thereof so that in one direction of reciprocation the stud is rotated in a direction to introduce slack into the system.

10. In reciprocating operating mechanism for valves and the like, the combination of a reciprocating part, a part bearing on said reciprocating part along a spiral path, yielding means tending to rotate said second-named part in a direction to project it outwardly from the first-named part, and a rocker engaging said second-named part to one side of its axis of rotation so that upon reciprocation of the mechanism in one direction said part is rotated in a direction to project it into the first-named part and introduce slack into the system.

In testimony whereof I affix my signature.

GEORGE P. BERRY.